United States Patent [19]

Niki

[11] 4,329,941
[45] May 18, 1982

[54] WATER DISPENSER FOR SMALL ANIMALS

[76] Inventor: Motohiro Niki, 22-11, Yushima 2-chome, Bunkyo-ku, Tokyo-to, Japan

[21] Appl. No.: 230,221

[22] Filed: Jan. 30, 1981

[51] Int. Cl.$^3$ ............................................. A01K 7/06
[52] U.S. Cl. ..................................... 119/72.5; 119/75
[58] Field of Search ................................ 119/72.5, 75

[56] References Cited

U.S. PATENT DOCUMENTS

| 2,939,424 | 6/1960 | Frederiksen | 119/72.5 |
| 3,734,063 | 5/1973 | Atchley | 119/72.5 |
| 3,874,343 | 4/1975 | Niki | 119/72.5 |
| 4,246,870 | 1/1981 | Gustin | 119/75 |

Primary Examiner—Hugh R. Chamblee
Attorney, Agent, or Firm—Ladas & Parry

[57] ABSTRACT

In a water dispenser for feeding small animals comprising a casing, water supply means having an outlet, valve means for controlling water feed disposed in the outlet, and a water feed tube, the valve means comprises: an elastic valve seat member having an annular disk portion constituting the valve seat and a cylindrical portion formed coaxially and integrally with the disk portion; a poppet valve normally closed against the valve seat and fixed to the upstream end of the feed tube, which, upon being nudged and moved at its downstream end by a small animal, opens the poppet valve to permit water from the supply means to enter the cylindrical portion of the valve and then into the feed tube; and a coil spring fitted in compressed state around the cylindrical portion to elastically reinforce the same.

7 Claims, 11 Drawing Figures

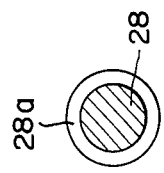
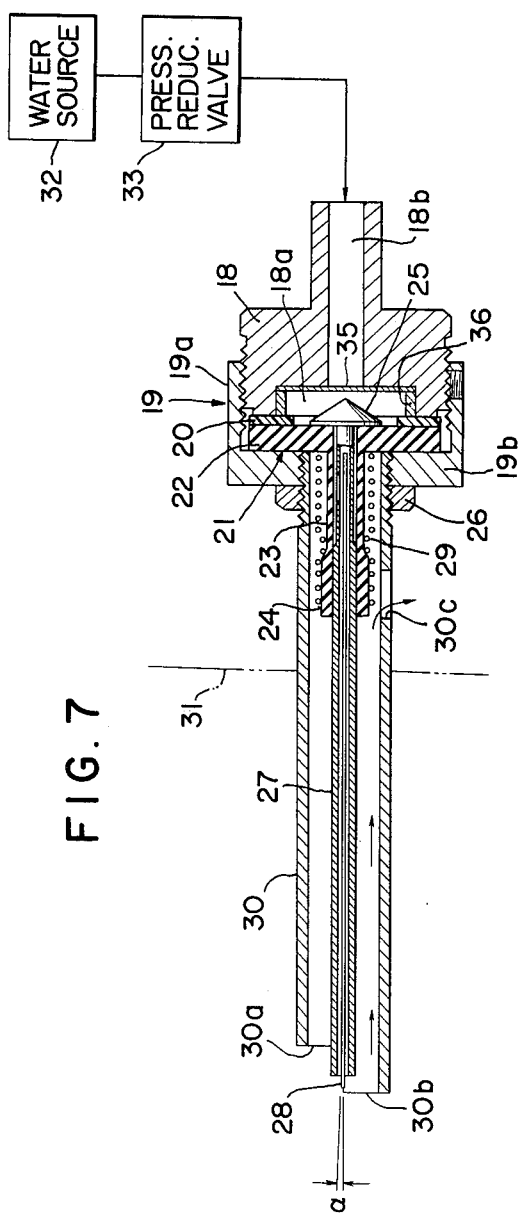
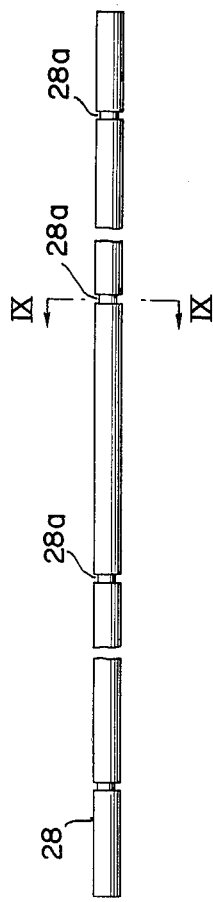

WATER DISPENSER FOR SMALL ANIMALS

BACKGROUND OF THE INVENTION

This invention relates generally to water dispensers for feeding small animals, and more particularly to an improved type thereof specifically adapted for feeding mice and rats.

Automatic feeding of drinking water to experimental animals is essential for labor-saving breeding of these animals and for providing a supply of drinking water at all times.

Among water dispensers for various small animals and birds, those for the mice and rats are technically most retarded, and very few of the devices proposed heretofore have been acceptable for general use. The reason for this is that a large number of water dispensers are required since mice and rats constitute a majority of the experimental animals. This requirement inevitably necessitates a simplified construction of water dispensers which can be produced at a substantially low cost.

Despite this necessity for low-cost construction, however, requirements such as prevention of water leakage, sterile state of the water dispenser, and provision of sensitivity in operation are more strict than those for the water dispensers for other animals and birds. These requirements arise from the requirement that the care of these animals be almost completely free of labor such as bed cleaning and drying and the requirement that the drinking water be readily supplied upon application of a weak nudging force of the mice and rats against a part of the water dispenser but can be instantaneously stopped upon removal of the same force with some amount of the water always kept in a part of the dispenser so that the animal can easily find the part to be nudged.

A further problem arises from the fact that, in the most successful water dispensers of the instant character known heretofore, at least one vital part is made of a flexible, elastic material such as a synthetic rubber. In the operation of the dispenser, this elastic part is called upon to undergo a large number of repeated deflections and deformations due to repeated stress, which will give rise to deterioration of the elastic property of the material if it is not elastically reinforced. Furthermore, all parts of the water dispenser must be periodically sterilized at high temperature and pressure, most conveniently with steam. This further hastens the deterioration of the elastic material.

SUMMARY OF THE INVENTION

Therefore, an object of the present invention is to provide a water dispenser for feeding small animals of simple construction and low production cost in which a vital elastic part is elastically reinforced by another elastic structure and thereby caused to have a prolonged serviceable life.

Another object of the present invention is to provide a water dispenser for feeding small animals having valve means which is sensitive in operation, whereby the drinking water can be released by a slight nudging of the water feed tube.

Still another object of the invention is to provide a water dispenser for feeding small animals wherein leakage of the drinking water at the time of closure of the valve is substantially eliminated.

According to this invention, briefly summarized, there is provided a water dispenser for feeding small animals having upstream and downstream directions and comprising: a casing supplied with water and having a water outlet at its downstream part; an elastic valve seal sealingly secured in said water outlet and having an upstream planar surface; a poppet valve having a valve surface normally engaging said planar surface in a water-tight manner; a feed tube secured at its upstream end to said poppet valve and extending downstream through said valve seat away from said casing, whereby when said feed tube is inclined by a nudging force applied by a small animal to the downstream end of said tube, said poppet valve is also inclined relative to said valve seat to allow the water in the casing to flow downstream through a gap formed between said valve seat and said poppet valve; means forming an annular water receiving space for temporarily receiving therein the water which has flowed through said gap; aperture means formed through said feed tube to conduct the water in said water receiving space into the interior of said feed tube to cause the water to flow downstream therein, said valve seat comprising an annular flange providing said planar surface and a cylindrical portion open at an upstream end and terminating at a downstream end wall, said feed tube extending downstream through the interior of said cylindrical portion with an annular space interposed therebetween and forming said water receiving space, said feed tube extending further downstream through a tight hole in said end wall, whereby water cannot leak between said feed tube and said end wall, said aperture means being formed in the part of the feed tube located in said cylindrical portion and a position upstream and remote from said end wall; and an elastic reinforcing structure fitted in compressed state encompassingly about and reinforcingly supporting at least said cylindrical portion of the valve seat.

The nature, principle, and utility of the present invention will be fully understood from the following detailed description with respect to preferred embodiments of the invention when read in conjunction with the accompanying drawings.

BRIEF DESCRIPTION OF THE DRAWINGS

In the drawing:

FIG. 7 is a side elevation, in longitudinal section, of another example of a water dispenser, of horizontal type, according to this invention;

FIG. 8 is an enlarged side view of a fluted rod to be inserted in the water feed tube of the water dispenser shown in FIG. 7;

FIG. 9 is a further enlarged cross section of the fluted rod taken along the plane indicated by line IX—IX in FIG. 8;

DETAILED DESCRIPTION OF THE INVENTION

Figure 1:
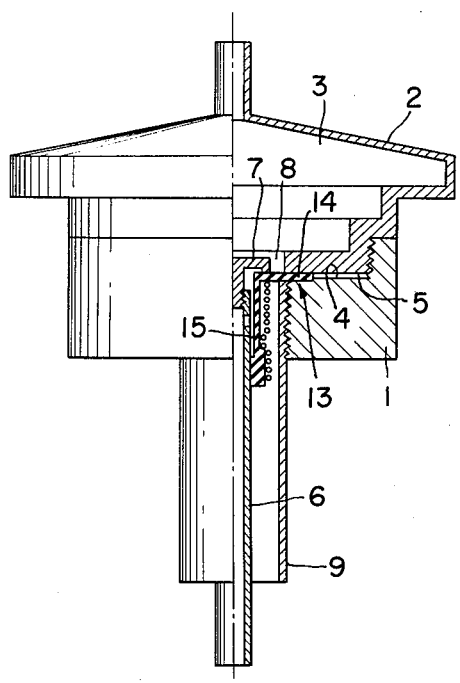
FIG. 1 is an elevational view, partly in vertical section, of an example of a water dispenser of vertical type according to this invention.

Referring first to FIG. 1, the example shown therein of the water dispenser according to the present invention for feeding drinking water to small animals comprises a casing (or a supporting member) 1 and a water supplying reservoir 2 screw fastened to the upper part of the casing 1. The reservoir 2 has an internal chamber 3 for storing drinking water, and the lower surface 5 of the bottom wall of the chamber 3 confronts the bottom surface of a central recess 4 in the casing 1, when the reservoir 2 is thus fastened to the casing 1, with a slight gap maintained therebetween. An outlet port 8 is provided at the center through the bottom wall of the chamber 3.

Figure 2:
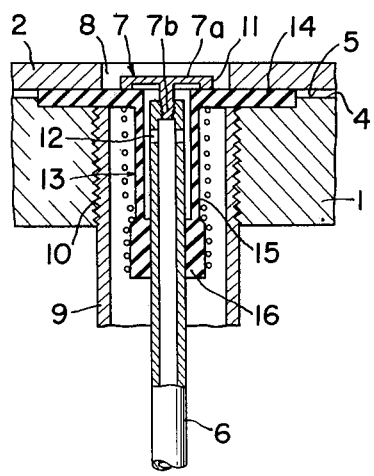
FIG. 2 is an enlarged vertical sectional view of an important part of the water dispenser shown in FIG. 1.
Figure 4:
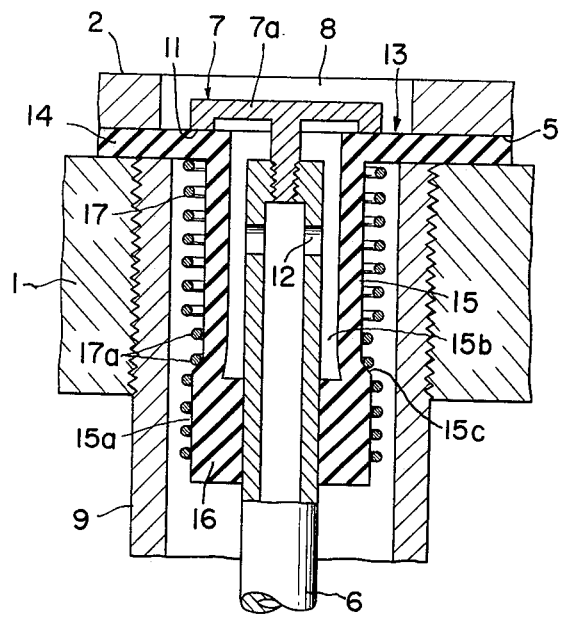
FIG. 4 is a further enlarged view, in vertical section, of the part shown in FIG. 2.

As shown in FIGS. 2 and 4, a poppet valve member 7 having a cap-like portion 7a having a diameter smaller than that of the outlet port 8 and having a T-shaped configuration in vertical section including a downwardly projecting central stem 7b is inserted in the outlet port 8, and the central stem 7b is fixedly connected to the upper end of a water feed tube 6. The casing 1 is further provided with a screw threaded central hole 10, and a guard tube 9 having a diameter corresponding to that of the hole 10 and having a threaded portion at the upper part thereof is screwed into the central hole 10. The water feed tube 6 is provided with a required number of perforations 12 near the upper end thereof connected to the stem portion 7b of the valve member 7.

An elastic valve seat member 13 formed into a T-shaped configuration in vertical section and having an upper flange seat portion 14 and a downwardly extending cylindrical portion 15 is further provided to cooperate with the valve member 7 as described hereinafter in more detail. The outer peripheral portion of the flange porton 14 is firmly clamped in a water-tight manner between the lower surface 5 of the bottom wall of the chamber 3 and the bottom surface of the central recess 4 and in a manner such that the downwardly extending cylindrical portion 15 is held concentrically with the outlet port 8 of the chamber 3 and with the poppet valve member 7 received therein.

More specifically, the poppet valve member 7 connected to the water feed tube 6 is inserted through the central hollow space of the cylindrical portion 15 of the elastic valve seat member 13 in a concentric manner such that the lower face 11 of the cap-like portion 7a, which is in this example formed with a peripheral edge slightly projecting downwardly, contacts the upper planar surface of the flange portion 14 of the elastic valve seat member 13.

Figure 5:
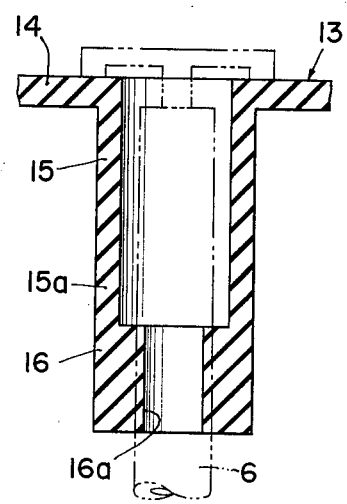
FIG. 5 is an enlarged view, in vertical section, showing principally an elastic valve seat member.

It should be noted that, as shown in FIG. 5, the central hollow space of the cylindrical portion 15 of the elastic valve seat member 13 is reduced in diameter at the lowermost end thereof so that an annular end wall 16 is formed and the water feed tube 6 passing through the cylindrical portion 15 of the valve seat member 13 is passed through and engages the end wall 16 in a water-tight manner, and an annular chamber 15b is formed, as shown in FIG. 4, within the cylindrical portion 15 of the elastic valve seat member 13 around the water feed tube 6. As clearly indicated in FIG. 5, the inner diameter of the central hole, defined by the inner wall surface 16a, through the end wall 16 is preferably less, before the water feed tube 6 is inserted therethrough, than the outer diameter of this tube 6. This difference in diameters will not only provide a water-tight fit between the inner surface 16a and the tube 6 but also tend to enlarge the outer diameter of the end wall 16, as shown in FIG. 4, to a value somewhat greater than the cylindrical portion 15 at its upper part, whereby an annular shoulder 15c will be formed around the outer surface at the junction between the cylindrical portion 15 and the end wall 16. This shoulder 15c has a useful function as described hereinafter.

Figure 6:
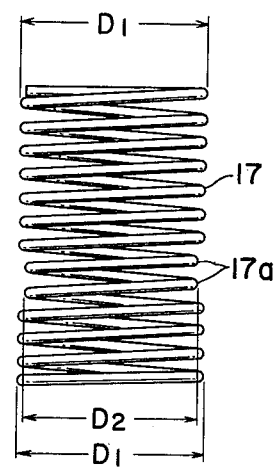
FIG. 6 is a side view of a spring to be fitted around a lower cylindrical portion of the valve seat member.

At least the cylindrical portion 15 of the elastic valve seat member 13, exclusive of the end wall part 16, is encompassed by an elastic reinforcing structure, which in the instant example is a coil spring 17. In the illustrated example, this coil spring 17, in its assembled state, extends from the bottom surface of the flange portion 14 of the member 13 to the lower end of the end wall 16. As best shown in FIG. 6, this coil spring 17 is of substantially the same coil diameter $D_1$ at its upper and lower ends but has a constricted intermediate part 17a of a diameter $D_2$ which is somewhat less than the diameter $D_1$. When the coil spring 17 is fitted on the cylindrical portion 15 in assembled state, it is in a compressed state, which is maintained by its abutment at its upper end against the lower surface of the flange portion 14 and by its firm constriction at its intermediate part 17a around the lower part 15a of the cylindrical portion 15 immediately above the aforedescribed shoulder 15a at the upper end of the end wall 16.

Because of the relatively small diameter $D_2$ of the intermediate part 17a of the spring 17, this lower part 15a is somewhat constricted by the inner surface of the part 17a to assume a depressed waisted shape. This waisted depression, together with the shoulder 15c, effectively functions to fixedly hold the intermediate part 17a of the spring 17. At other parts of the diameter $D_1$ of the coil spring 17 above and below the intermediate part 17a, the spring 17 is fitted somewhat loosely around or is clear of the cylindrical portion 15 or the end wall 16.

The coil spring 17 functions to assist the elastic cylindrical portion 15 of the valve seat member 13 in exerting a downward force on the cap-like portion 7a of the poppet valve member 7 (or exerting an upward force on the flange portion 14) tending to keep the lower surface 11 of the cap-like portion 7a in tight intimate contact with the upper surface of the flange portion 14 of the valve seat member 13 when the valve member 7 is in its normally closed state. This function of the coil spring 17 is important particularly when the silicone rubber valve seat member 13 loses some of its elasticity after a great number of sterilizations with steam.

Another function of the coil spring 17 is to reinforcingly hold the lower part of the cylindrical portion 15 and end wall 16 of the valve seat member 13 thereby to deter cracking or tearing of these parts and, in the event that cracks or tears should develop, to prevent them from spreading.

In the water dispenser of the above described construction, the elastic valve seat member 13 is made of a heat-resistant and water-resistant material having the required elasticity such as a synthetic rubber, preferably a silicone rubber. All other parts are preferably made of 18-8 stainless steel so that they can withstand repeated sterilization with steam and resist corrosion.

For actual use, the water dispenser is secured to an appropriate member in a cage of the mice or rats, and water is supplied into the chamber 3 within the water supplying reservoir 2. In this state, the flowing down of the water is stopped by the poppet valve member 7, with the lower surface 11 of the poppet valve member 7 engaging the upper planar surface of the elastic valve seat member 13.

Figure 3:
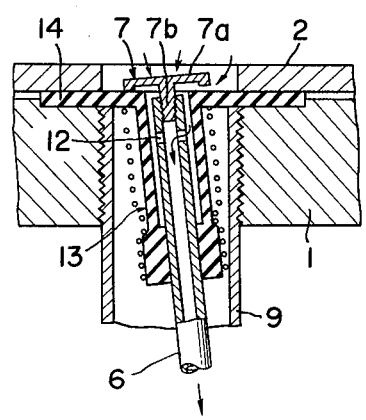
FIG. 3 is a sectional view similar to FIG. 2 showing the water dispenser in an operational state wherein the valve means is partly opened.

When the lower end of the water feed tube 6 is touched by small animals such as mice and rats, the water feed tube 6 is thereby inclined as shown in FIG. 3 against the resilient force of the elastic valve seat member 13. The cap-like portion 7a of the poppet valve member 7 at the upper end of the water feed tube 6 is thereby inclined relative to the upper planar surface of the valve seat member 13, thus forming a narrow gap on one side thereof between the lower surface 11 of the cap-like portion 7a and the upper surface of the valve seat member 13. Water in the chamber 3 is thus passed through the narrow gap into the annular space 15b formed within the cylindrical portion 7b of the valve seat member 13. The water is then passed through the apertures 12 to the interior of the water feed tube 6, and thereafter toward the lower end of the water feed tube 6.

Since the lower end wall 16 of the cylindrical portion 15 of the valve seat member 13 engages the circumferential wall of the water feed tube 6 in an water-tight manner, any leakage of water through this part is completely eliminated. Furthermore, the sizes of the poppet valve 7, apertures 12 and the inner diameter of the water feed tube 6 are so selected that the flowrate of the water flowing through the water feed tube 6 at the time when the lower end thereof is touched by a mouse or rat becomes suitable for normal drinking of the water by the mouse or rat. In this manner, the possibility of the water being spilled onto the cage bed can be substantially eliminated.

When the animal ceases to nudge the lower end of the water feed tube 6, the poppet valve instantaneously stops the water flow. In this case, however, the water filling the interior of the water feed tube or at least the space formed in the cylindrical portion 15 of the valve seat member 13 is retained even after the closure of the valve means. A mouse or rat that desires to drink water senses the water vapor coming from the lower end of the water feed tube 6 and nudge the end as described above.

The guard tube 9 protects the water feed tube 6 from any mechanical damage, and limits lateral movements of the water feed tube 6. When it is desired to readjust the contact pressure between the cap-like portion 7a of the valve member 7 and the valve seat member 13, the water feed tube 6 can be slightly pushed into or pulled out of the cylindrical portion 15 of the valve seat member 13.

In another embodiment of this invention as illustrated in FIGS. 7 through 11, the water dispenser is adapted for use in a substantially horizontal state with its valve mechanism disposed outside a vertical wall 31 of a cage or pen housing one or more small animals and with its water-dispensing end disposed inside the vertical wall 31. In actual use, the water dispenser is mounted with a slight inclination as indicated by a small angle $a$, that is, the axis of the dispenser is downwardly sloped from the water-dispensing end toward the valve mechanism. The purpose of this inclination is described hereinafter.

This water dispenser has a casing (or a supporting member) 19 of the shape of a cylindrical cup or screw socket comprising a cylindrical wall part 19a with a tapped inner surface and an end wall part 19b with a central tapped hole. A nipple-like screw fitting 18 having a recessed cavity 18a at its inner end and a central through hole 18b communicating with the cavity 18a and the open inner end of the fitting 18 is screwed into the cylindrical wall part 19a of the casing 19. When this screw fitting 18 is thus fully screwed into the casing, its inner end abuts against an annular elastic washer 20 coaxially contacting the flange part 22 of an elastic valve seat member 21 which is in contact on its opposite side with the above mentioned end wall part 19b of the casing 19. The washer 20 and the flange part 22 of the valve seat member 21 are thereby clamped between the screw fitting 18 and the casing 19.

The outer threaded end of a guard tube 30 is screwed into the above mentioned central tapped hole of the end wall part 19b of the casing 19. A nut 26 is also screw engaged with the threaded end of the guard tube 30 to lock the screw engagement between guard tube 30 and the casing 19. A semicylindrical cutout 30a is formed at the inner or downstream end of the guard tube 30 so as to expose the inner or downstream end of a feed tube 27 to nudging action by a small animal. The extreme inner end 30b of the guard tube 30 which is not thus cut out extends inward beyond the inner end of the feed tube 27 and thus protects the feed tube. This extreme inner end 30b also serves as a drip pan to catch excess or unused water dripping from the inner end of the feed tube 27.

Figure 10:
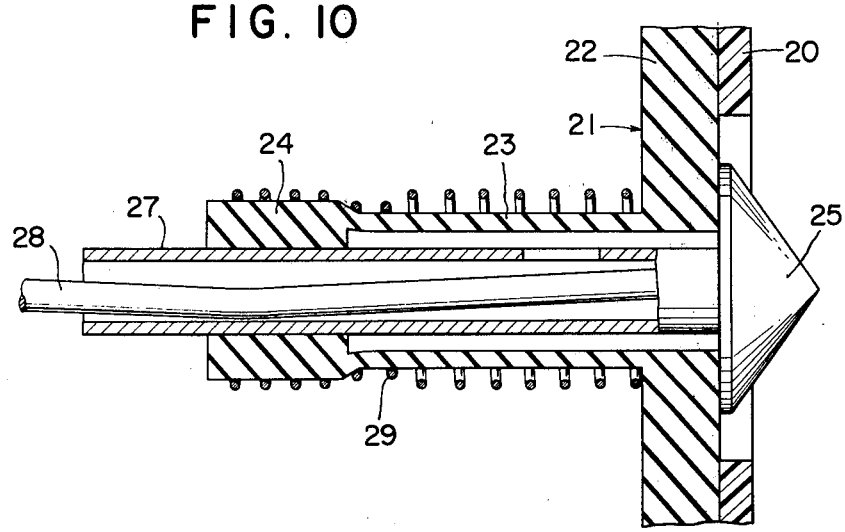
FIG. 10 is an enlarged side elevation, in vertical section, of the valve and valve seat part of the water dispenser shown in FIG. 7.
Figure 11:
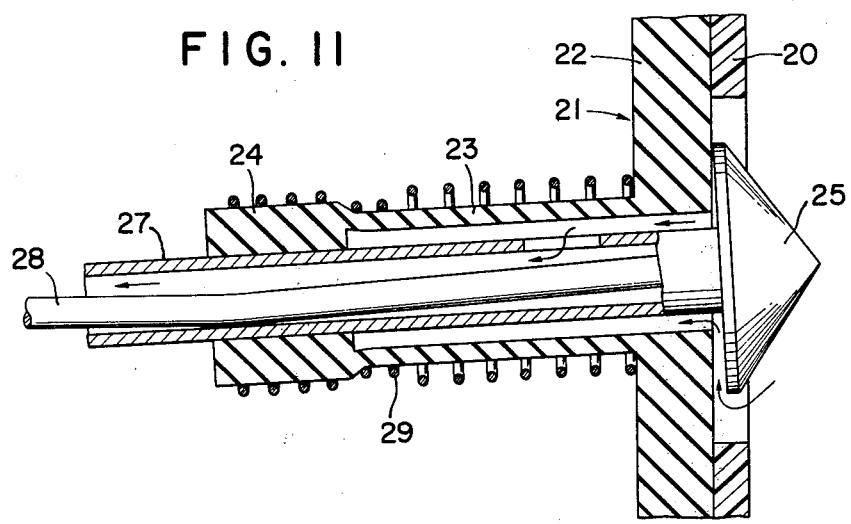
FIG. 11 is a view similar to FIG. 10 showing the water dispenser in an operational state wherein the valve means is partly opened.

The elastic valve seat member 21 comprising the flange part 22, a cylindrical stem part 23, and an end wall part 24 as shown in FIG. 10 is similar to the valve seat member 13 in the preceding embodiment of the invention. A coil spring 29 also similar to the coil spring 17 in the preceding example is provided around the stem part 23 and the end wall part 24. Detailed description relating to the valve seat member 21 and the coil spring 29 will be omitted because of the above mentioned similarities.

A valve 25 of conical shape is provided to function similarly as the valve 7 in the preceding example but is fixed directly to the outer or upstream end of a water feed tube 27, which is similar to the water feed tube 6 of the preceding example and functions as a valve stem. This water feed tube 27 is provided therein with a feed control rod 28 as shown in FIGS. 8 and 9, which has a function similar to that of a so-called feed in a fountain pen for flow control. That is, this water dispenser is supplied with water from a source 32 of water, such as tap-water supply, by way of a pressure reducing valve 33 as indicated in FIG. 7, and, although the source water pressure is reduced somewhat by the valve 33, the water is apt to rush through the feed tube 27 and gush out wastefully into cage and onto the cage bed when the valve 25 is opened unless its flow is controlled by means such as the feed control rod 28.

This feed control rod 28 is of a diameter such that the space formed between it and the inner wall surface of the feed tube 27 is of suitable capillary dimension. Three or more discontinuous grooves 28a are formed in this feed control rod 28 in the longitudinal direction thereof. These grooves 28a, which may be omitted if desired, have been found to add to the effectiveness of the feed control. The rod 28 can be retained in the feed tube 27 by any of various means. A very simple measure for this purpose, as indicated in FIG. 10, is to bend the rod 28 slightly before inserting it into the feed tube 27 thereby to cause it to be retained in the feed tube by friction.

In certain cases, the water supplied from the water source 32 may contain impurities, which would impair the operation of water dispenser. Accordingly, a filtering device 35 is provided at the inlet to the cavity 18a of the screw fitting 18 and is held in place by a spacer 36. A pressure relief valve (not shown) may be provided in the water supply line at a point upstream from this filter device 35 in order to prevent excessive pressure buildup on the filter device in the event that it should become clogged with impurities. This precaution may be unnecessary since the water dispenser is ordinarily cleaned and sterilized quite frequently.

The operation of the water dispenser of the above described construction is similar to that of the preceding embodiment of this invention. That is, when a small animal in the cage to the left of the wall 31 in FIG. 7 nudges the inner end of the rod 28 and/or the feed tube 27, the moment exerted on the feed tube 27 causes the valve 25 to tilt relative to the valve seat surface of the valve seat member 21, whereby water supplied into the cavity 18a passes through the resulting gaping gap between the valve 25 and its seat into the space between the feed tube 27 and the feed control rod 28 and travels to the inner end of the feed tube 27.

Any excess or unused portion of the water thus fed drops downward from the inner end of the feed tube 27 onto the lower part of the interior of the guard tube 30 at its extreme inner end 30b. The water thus caught by the guard tube 30 and prevented from dripping onto the bed or floor of the cage flows outward along the bottom part of the guard tube 30 as indicated by arrows, because of the aforedescribed inclination of the water dispenser, and flows out of the guard tube 30 through a drain hole 30c at a point outside of the cage.

What we claim is:

1. A water dispenser for feeding small animals having upstream and downstream directions and comprising: a casing supplied with water and having a water outlet at its downstream part; an elastic valve seat sealingly secured in said water outlet and having an upstream planar surface; a poppet valve having a valve surface normally engaging said planar surface in a water-tight manner; a feed tube secured at its upstream end to said poppet valve and extending downstream through said valve seat away from said casing, whereby when said feed tube is inclined by a nudging force applied by a small animal to the downstream end of said tube, said poppet valve is also inclined relative to said valve seat to allow the water in the casing to flow downstream through a gap formed between said valve seat and said poppet valve; means forming an annular water receiving space for temporarily receiving therein the water which has flowed through said gap; aperture means formed through said feed tube to conduct the water in said water receiving space into the interior of said feed tube to cause the water to flow downstream therein, said valve seat comprising an annular flange providing said planar surface and a cylindrical portion which is open at an upstream end and terminates at a downstream end wall, said feed tube extending downstream through the interior of said cylindrical portion with an annular space interposed therebetween and forming said water receiving space, said feed tube extending further downstream through a tight hole in said end wall, whereby water cannot leak between said feed tube and said end wall, said aperture means being formed in the part of the feed tube located in said cylindrical portion and a position upstream and remote from said end wall; and a coil spring fitted in compressed state encompassingly about said cylindrical portion and reinforcingly supporting from outside said cylindrical portion of the valve seat, the cylindrical portion having a downstream end wall part of enlarged outer diameter, forming an annular shoulder against which a portion of said coil spring abuts, the portion of the coil spring, adjacent to said annular flange, being in abutment with the annular flange whereby an axial tension is exerted to the cylindrical portion by the coil spring.

2. A water dispenser according to claim 1 in which the upstream and downstream directions are substantially vertical during the use of the dispenser, the axes of the feed tube, the poppet valve, the water receiving space and the cylindrical portion, being substantially vertical, and which further comprises a water supplying reservoir secured to the upper part of the casing and having an internal chamber for storing drinking water.

3. A water dispenser according to claim 1 in which said part of enlarged diameter is formed by elastic deformation of the end wall part in radially outward direction due to the fact that the inner diameter of downstream end wall part is smaller than the outer diameter of the water feed tube passed through the downstream end wall part.

4. A water dispenser according to claim 3 in which the coil spring has a coil diameter at an intermediate part thereof, which diameter is less than the coil diameter at other parts of the coil spring, the intermediate part being in abutting relation to the annular shoulder of the cylindrical portion.

5. A water dispenser according to claim 1, further comprising a guard tube encompassing and extending along said feed tube and fixed at the upstream end thereof to said casing, whereby the feed tube is protected against undue external forces and its lateral inclining movement is limited.

6. A water dispenser according to claim 5 in which the upstream and downstream directions are substantially horizontal during the use of the dispenser, the axes of the feed tube, the poppet valve, the water receiving space, and the cylindrical portion being substantially horizontal, at least the guard tube being inclined slightly upwardly in the downstream direction, and is mounted with the upstream and downstream parts thereof respectively disposed outside and inside of a vertical wall of an enclosure for housing one or more small animals.

7. A water dispenser according to claim 6, further comprising a flow control rod inserted in the feed tube to prevent excessive rushing of water therethrough, the guard tube being adapted to catch spilt or unused water dripping from the downstream end of the feed tube and to discharge said water through a drain hole disposed outside of said enclosure.

* * * * *